No. 625,216. Patented May 16, 1899.
F. W. TOBEY.
DEVICE FOR SUPPORTING AND ADJUSTING MIRRORS.
(Application filed Dec. 18, 1897.)
(No Model.)
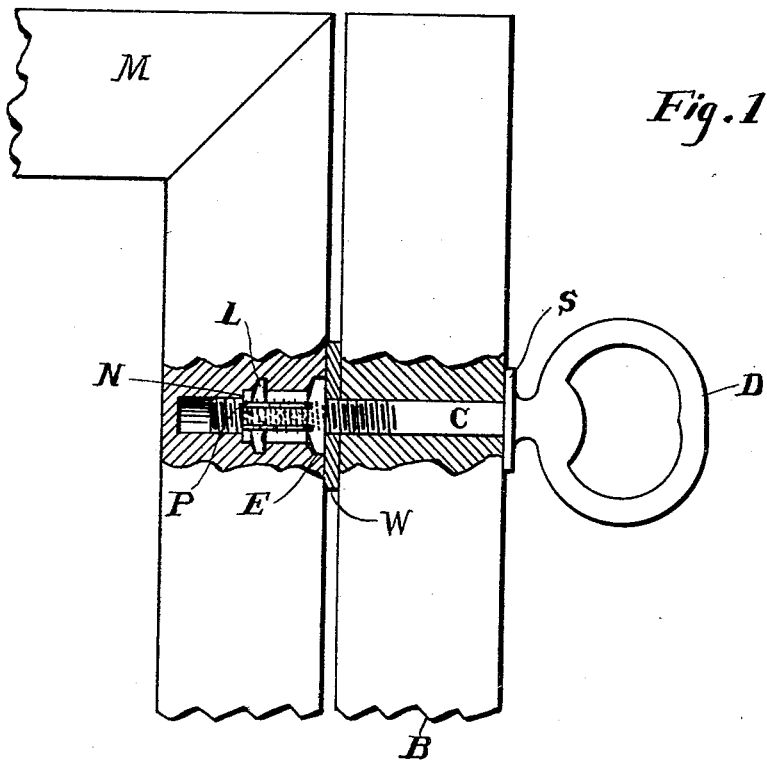
Fig. 1.
Fig. 2.
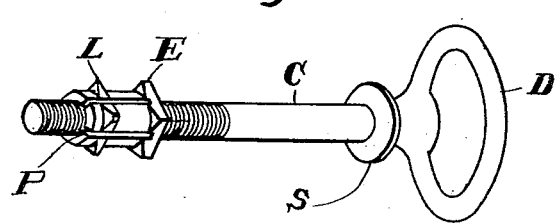
Witnesses
Harry J. Perkins.
Christopher Hudelink
Inventor
Fred W Tobey
By his Attorney
Edward Taggart

United States Patent Office.

FRED W. TOBEY, OF GRAND RAPIDS, MICHIGAN.

DEVICE FOR SUPPORTING AND ADJUSTING MIRRORS.

SPECIFICATION forming part of Letters Patent No. 625,216, dated May 16, 1899.

Application filed December 18, 1897. Serial No. 662,470. (No model.)

*To all whom it may concern:*

Be it known that I, FRED W. TOBEY, a citizen of the United States, residing at the city of Grand Rapids, in the county of Kent and State of Michigan, have invented a certain new and useful Device for Supporting and Adjusting Mirrors, of which the following is a specification.

This invention relates to a new and useful device for hanging and adjusting mirrors in dressing-cases and other analogous pieces of furniture and for various other purposes to which the same may be adapted; and the invention consists in combining with a screw-threaded nut a projection or sleeve, preferably screw-threaded, having slots or openings which allow the sleeve portion to be contracted and expanded; also in the combination, with the spring-sleeve nut, of a screw-bolt adapted to engage with said nut and to expand the sleeve, the sleeve being adapted to contract when the bolt has been removed; also in the combination of such bolt and nut with the frame of a mirror and its supporting-standard for the purpose of adjusting and retaining the mirror in any required position.

The objects of my invention are, first, to furnish means for securing a nut in position in wood or other material, so that when a screw or screw-bolt engages with the nut the nut cannot be withdrawn; second, to secure the nut in this fixed position by the insertion of the screw-threaded bolt; third, to furnish an efficient means for adjusting and retaining a mirror in any required position in its supporting-standards. These objects I accomplish by means of the mechanism illustrated in the accompanying drawings, in which—

Figure 1 shows an elevation of a mirror with its supporting-standards, a portion of the mirror-frame and standard being cut away for the purpose of showing the position of the nut in the mirror-frame and the position of the bolt which passes through the standard to engage with the spring-sleeve nut. Fig. 2 shows in perspective the nut and screw-threaded bolt.

Like letters refer to like parts throughout both views.

B shows the standard, which supports the mirror-frame at one side.

M shows the mirror-frame.

C shows the bolt, which in the example of my invention shown in the drawings is provided with a thumb-piece D, also provided with a shoulder S. The forms of these bolts may be various, and I do not desire to limit myself to any peculiar form of bolt, excepting that the bolt has a screw-thread adapted to engage with the nut.

N shows the nut, having the solid part E and the sleeve extending therefrom and provided with the slots P. These slots P should extend, preferably, substantially the length of the sleeve, so as to leave between the slots bars which are adapted to spring toward and from each other.

L shows projections or lugs on the sleeve portion of the nut, and these are made with an incline, preferably, so that the hole may be bored into the wood or other material to which the nut is to be applied, and the nut may be driven into such opening, the spring-sleeve contracting so as to leave the nut to pass into the opening. Having placed the nut in the opening, the bolt C is applied, the bolt being of sufficient size to fit the opening in the head of the nut, and as the bolt is pressed down or screwed into the nut the spring-sleeve will be expanded so as to entirely fill the opening, and in cases where the hole or opening is in wood the projections L will be driven into the wood, thereby attaching the nut securely to the wood and rendering it substantially impossible to remove the same until the bolt shall have been withdrawn. In case the hole is flaring or larger at the inner than at the outer end the lugs or projections L may be dispensed with.

When this device is used for the purpose of supporting a mirror-frame, as is shown in Fig. 1 of the drawings, I provide a shoulder S, which is adapted to bear against the outer side of the standard B, and I also prefer to use a washer W between the standard and the mirror-frame. However, both the washer and the shoulder may be dispensed with, especially in cases where the screw-thread on the bolt C is adapted to engage with the standard B.

I have referred to the use of my invention as adapted for suspending mirror-frames; but it is evident that the same may be applied to various uses where it is found desirable to secure a nut in position so that the same cannot be withdrawn without the removal of the bolt which engages therewith. Not only does the bolt securely lock the nut in position; but the nut acts with a friction-pressure upon the bolt, so that a bolt secured to a nut constructed as I have described could not work loose, but would remain permanently in position until removed by the application of sufficient force.

Having thus described my invention, what I claim to have invented, and desire to secure by Letters Patent, is—

The combination with a mirror-frame having an opening formed in its side and a standard for said frame, of a nut adapted to be inserted in said opening and having a spring-sleeve provided with a number of slots and a number of lugs or projections, and a bolt passing through the standard and adapted to engage with and expand the sleeve of said nut to cause the projections thereon to engage with the wall of said opening in the mirror-frame, substantially as described.

In witness whereof I have hereunto set my hand and seal in the presence of two witnesses.

FRED W. TOBEY. [L. S.]

Witnesses:
LOYAL E. KNAPPEN,
CHRISTOPHER HONDELINK.